Feb. 10, 1931.  R. T. WILLIAMS  1,791,589
DAMPER CONTROL FOR HOUSE HEATING SYSTEMS
Filed March 22, 1930   2 Sheets-Sheet 1

Inventor
Robert T. Williams
by Parker & Carter
Attorneys.

Feb. 10, 1931. R. T. WILLIAMS 1,791,589
DAMPER CONTROL FOR HOUSE HEATING SYSTEMS
Filed March 22, 1930   2 Sheets-Sheet 2
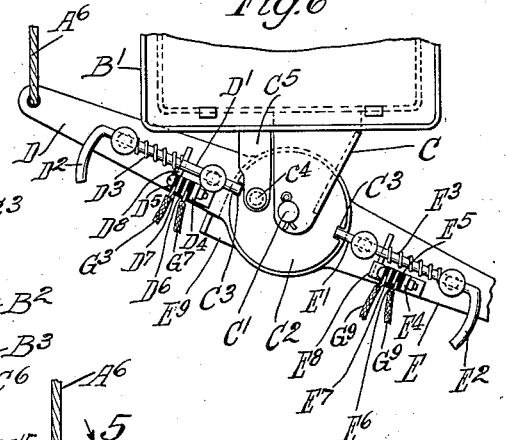
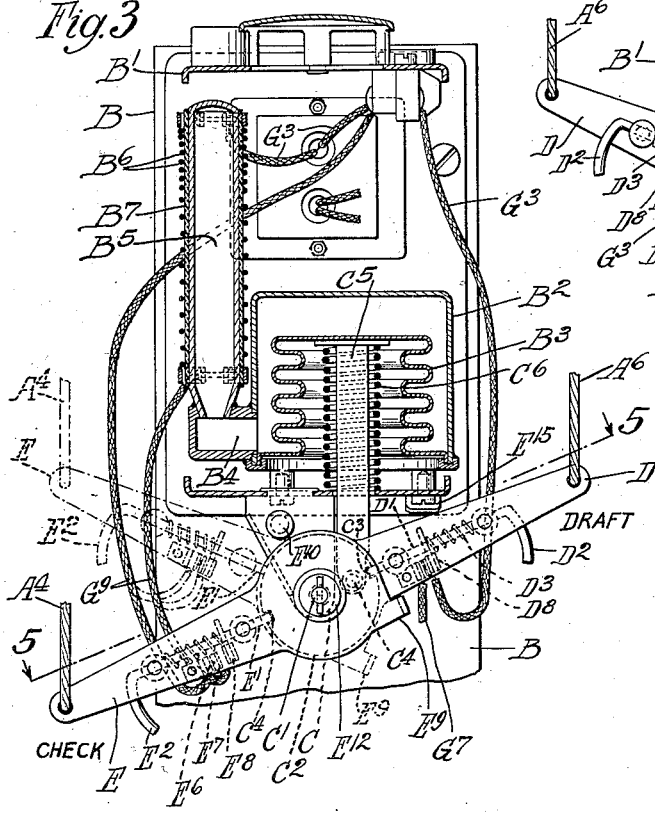
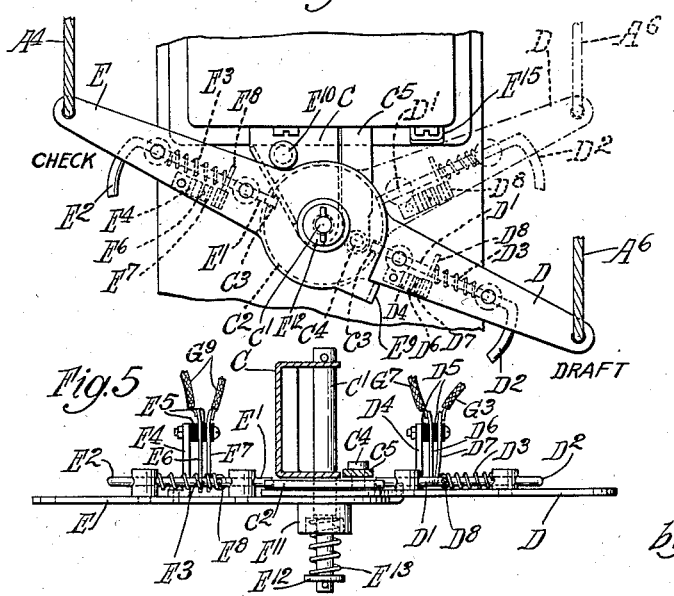
Inventor
Robert T. Williams
by Parker & Carter
Attorneys.

Patented Feb. 10, 1931

1,791,589

UNITED STATES PATENT OFFICE

ROBERT T. WILLIAMS, OF QUINCY, ILLINOIS, ASSIGNOR TO H. M. SHEER COMPANY, OF QUINCY, ILLINOIS, A CORPORATION OF ILLINOIS

DAMPER CONTROL FOR HOUSE-HEATING SYSTEMS

Application filed March 22, 1930. Serial No. 438,053.

My invention relates to improvements in damper controls for house heating systems and the like, and has for one object to provide, in connection with a thermostatically controlled or automatic damper operating motor or mechanism, means whereby an operator working on the furnace at a point removed from the automatic control may manipulate the damper operating mechanism in such manner as to permit closing of the damper for coaling of the furnace without change in the balance of the apparatus, and whereby such control will automatically throw back into normal operation after a predetermined interval. Other objects will appear from time to time in the course of the specification and claims.

I illustrate my invention more or less diagrammatically in the accompanying drawings, wherein—

Figure 3 is a section on the line 3—3 of Figure 2;

Figure 4 is a portion of the structure shown in Figure 3, illustrating the parts in different position;

Figure 5 is a section on the line 5—5 of Figure 3;

Figure 6 is a rear view of the structure shown in Figure 3; and

Like parts are indicated by like characters throughout the specification and drawings.

Figure 1:
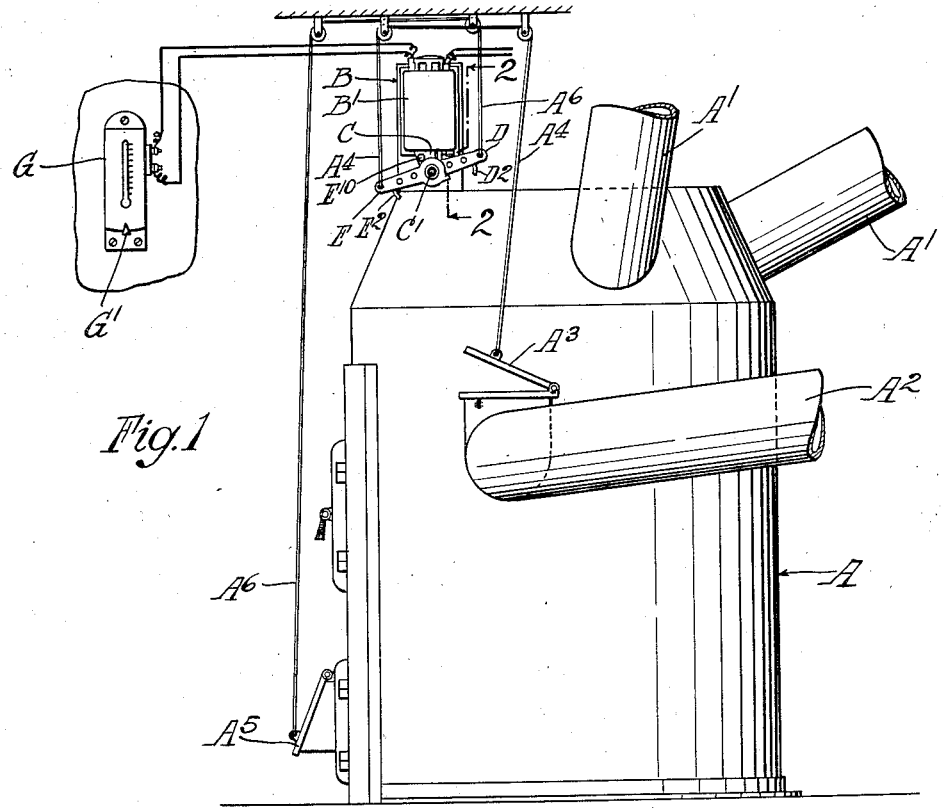
Figure 1 is a front elevation of my device as applied to a furnace.

A generally indicates a furnace, with the air outlet passages $A^1$ and the draft or exhaust outlet $A^2$ from the firebox within the furnace. $A^3$ indicates a check control which may be actuated as by the flexible member or cable or chain $A^4$. $A^5$ indicates a draft door which may be actuated as by the flexible member or chain or guard $A^6$.

B generally indicates a panel or base upon which is mounted the housing $B^1$ for the control mechanism below described. The mechanism includes a fluid motor having the expansion chamber $B^2$ with the flexible bellows $B^3$. Communicating with the space between the members $B^2$ and $B^3$ is the passage $B^4$ which in turn communicates with the heating chamber or cylinder or tube $B^5$. It will be understood that any suitable liquid or fluid which expands and contracts readily in response to changes in temperature may be employed. Any suitable means for heating the chamber $B^5$ may be employed and I indicate for example the resistance heating coil $B^6$ which may be wound upon the insulating covering or tube $B^7$.

Positioned adjacent the heat motor so described is a pivot bracket C upon which may be any suitable pivot pin $C^1$. Mounted upon the pin is a hub or plate $C^2$. In the present instance the plate and pin are held against relative rotation, and the pin rotates. If desired, the pin could be held against rotation and the hub mounted to rotate upon it, but the disposition herein described is preferred. Formed in the edge of said hub are opposed notches $C^3$. Pivoted to the hub as at $C^4$ is a plunger $C^5$, which penetrates the interior of the bellows $B^3$ and abuts against its upper portion. It will be understood that in response to expansion or contraction of the bellows, the member $C^5$ moves longitudinally and imparts rotation to the hub $C^2$. $C^6$ indicates yielding means tending normally to expand the bellows $B^3$.

Positioned for rotation about the pin $C^1$, and lying in a plane preferably parallel with and closely adjacent the plane of the hub $C^2$ is a lever arm D having mounted thereon a latch member $D^1$ with the manual handle $D^2$. A spring $D^3$ tends normally to move the latch member $D^1$ into locking engagement with one of the notches $C^3$, as shown in Figure 6. Mounted upon the lever D is a bracket $D^4$ carrying insulating spacers $D^5$, upon which are mounted contacts $D^6$ $D^7$. $D^8$ is an insulated pin mounted upon the latch $D^1$ and adapted, in response to movement of the latch, to move the contacts $D^6$ $D^7$ into circuit closing position. It will be understood, as from Figures 3 and 6, that when the latch $D^1$ is in locking position the circuit is closed through the contacts $D^6$ $D^7$. On the other hand, if the latch is withdrawn from locking position, and engages the periphery of the hub C², instead of penetrating the slot C³, the circuit is broken, since the contact D⁷ will spring away from the contact D⁶.

Mounted for rotation about the pin C¹, and positioned closely adjacent the lever above described, is a second lever E with a latch E¹ having the manual control handle E² and the spring E³ normally tending to thrust it into locking engagement with the other of the notches C⁵ in the hub C². E⁴, indicates a bracket on the lever E, carrying the insulating spacers E⁵. E⁶, E⁷ are contacts corresponding to the contacts D⁶ D⁷ above described. E⁸ is an insulated pin mounted upon or for movement with the latch E¹. It will be understood that when the latch E¹ is in locking position, and abuts against the edge of the hub C², the circuit through the contacts E⁶ E⁷ is closed. E⁹ indicates an abutment associated with the lever E, adapted to limit the movement of the lever D. When the lever D engages the abutment E⁹, the levers D and E are aligned as shown in Figure 4. This contact takes the strain or sheer from the pin or latch D¹, when it is engaging one of the notches C³. E¹⁰ indicates a stop pin mounted on the bracket C, adapted to limit the clockwise movement of the lever E, as shown in Figure 4. The spring E¹⁵ limits the counterclockwise movement of the lever D, as shown for example in Figure 2. Further associated with the lever E is the hub or spring abutment E¹¹. E¹² indicates another spring abutment mounted upon the pin C¹, and E¹³ a spring adapted to be compressed between the two, to hold the two levers in close juxtaposition with the hub C².

It will be understood that the flexible connection A⁴ from the check A³ extends to the end of the lever E, while the flexible draft connection A⁶ extends to the lever D. Any desired arrangement of pulleys and guiding means may be employed which, as they form of themselves no part of the present invention, are not herein described in detail.

Figures 2, 7:
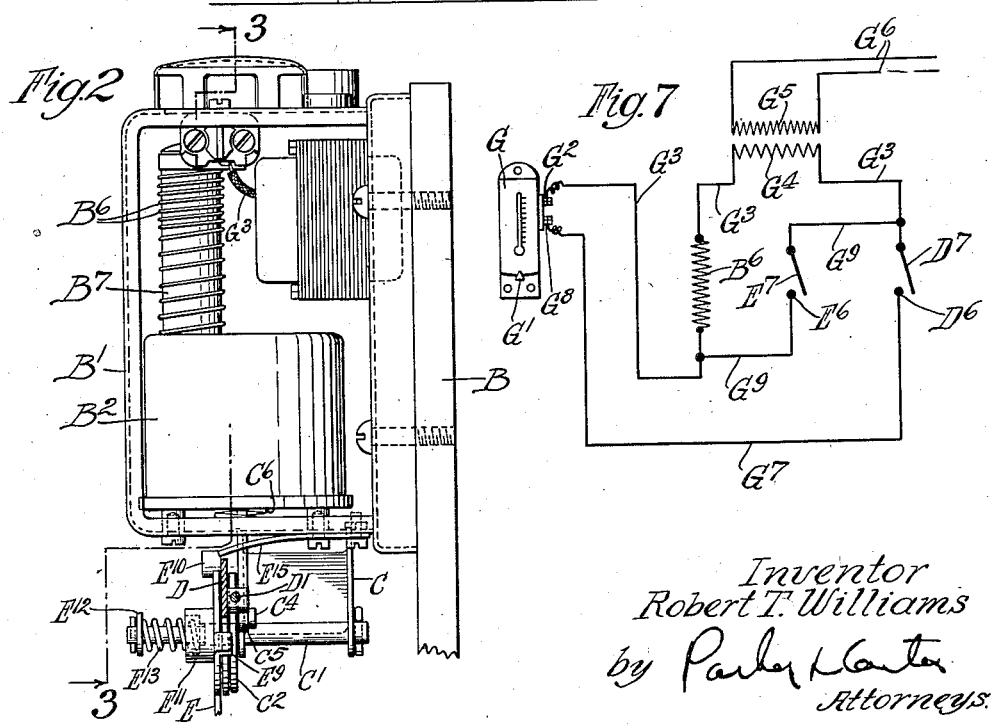
Figure 2 is a section on the line 2—2 of Figure 1, on an enlarged scale.
Figure 7 is a wiring diagram.

Referring to the wiring portion of Figure 1 and to the wiring diagram of Figure 7, G indicates any suitable thermostat which may be set, as by the pointer G¹ to make and break the actuating circuit in response to predetermined temperature fluctuations. Extending from the one terminal G² of the thermostat is the line G³ to the heating coil B⁶ and thence to the secondary transformer coil G⁴. G⁵ is the primary coil of the transformer with the actuating conductive connections G⁶. G³ continues from the secondary coil G⁴ to the movable contact D⁷. When D⁷ is in contact with D⁶ the circuit continues through the line G⁷ to the other thermostat terminal G⁸. It will be understood that the switch above described is in series with the thermostat and is normally closed. Shunted across the circuit above described is the conductor G⁹ which extends from the line G³, as shown in Figure 7, through the contacts E⁷ E⁶, to the heating coil B⁶. It will be thus seen that when the switch D⁷ is open and the switch E⁷ closed the heating coil B⁶ may be energized independently of the making and breaking of the circuit through the thermostat.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

In a thermostat operated control for a domestic heating plant, the operation is made to depend upon temperature conditions more or less remote from the heating plant, as by the use of a thermostat responding to temperature conditions in a dwelling house. In supplying fuel to the domestic heating plant, the operator who stokes the furnace normally closes the check, if it is open, when he comes to stoke. The present invention is directed to permit the operator to interrupt, in this fashion, the normal thermostatic control of drafts and check, while insuring that this interruption shall not be permanent. Unless means are provided for terminating this manual interruption of the normally automatic thermostatic control, the operator may go off and leave the furnace, and forget to return it to automatic control condition. Referring in detail to the operation of the present device, when the draft side is manually released, a temporary break is established in the actuating circuit through the coil B⁶. This causes the motor or bellows B³ to expand, owing to the decrease in the area occupied by the liquid, the liquid or fluid cooling and shrinking upon the termination of the heating effect of the coil B⁶. Accordingly the member C⁵ is upwardly moved and imparts to the hub C² a counter clockwise rotation. Referring for example to Figure 4 the position of the lever D is indicated in full line when the draft is open. When the operator wishes to close the draft he unlatches the latch D¹, and moves the lever D to the dotted line position. This interrupts the circuit through the coil B⁶, and thereafter, as above described, the consequent lifting of the member C⁵ rotates the hub C² until the slot C³ is in line with the latch D¹. When the latch penetrates the slot, the circuit through the thermostat coil B⁶ is again closed and normal thermostatic operation of the device is resumed.

When the check side is manually released, to close the check, it will be seen, upon reference to Figure 3, that the lever E will be manually moved from the full line to the dotted line position. However, when the latch E¹ is withdrawn to release the lever E for such rotation, the circuit through the contacts E⁶ E⁷ is closed, and the heating coil B⁶ is actuated, independently of the thermostatic connection. This establishes a temporary circuit through the heat motor, a circuit in which the thermostat is not included, and the consequent expansion of the fluid in the system contracts the bellows B³ and imparts a clockwise rotation to the hub C², which continues until the latch E¹ again penetrates its opposed slot E³. When such penetration takes place, the temporary circuit above described is broken and the device is ready for its normal and continuous thermostatic control.

It will be understood that if, when the operator wishes to stoke the furnace, it happens that the two levers are in horizontal position, the operator may release both levers, to close both draft and check. The ensuing operation, as to each lever, will be the same as above described. The lever E would first be picked up, since the temporary circuit through the coil B⁶ would be closed. As soon as the lever E is picked up and the temporary circuit is broken, the cooling of the heat motor will cause a reverse rotation of the hub C², which will continue until the other arm is also picked up. Thereafter the normal function of the thermostatic control will continue.

It will be realized that whereas I have indicated a specific control means or latch, that many changes or variations may be made in the means for actually effecting the movement of the latches, and in making and breaking the circuits above described. I do not wish to be limited to my specific showing in this respect, except so far as I specifically limit myself in my claims.

I claim:

1. In combination with an automatic damper control, an actuating member, a plurality of levers positioned adjacent said actuating member, and means for independently and removably connecting said levers to said control member, the levers being adapted normally to move, when connected thereto, as a unit with said control member.

2. In combination with a motor, a pivoted member adapted to be actuated by the motor, and an actuating connection intermediate said pivoted member and motor, a plurality of levers pivoted adjacent said member and concentrically therewith, means for securing said levers against movement in relation to said member, and means for releasing said securing means.

3. In combination with an automatic damper control, a controlling lever mounted for movement, the lever including a plurality of concentrically pivoted arms, each adapted to be attached to a separate control member, the lever being adapted to move as a unit and provided with manually controlled means whereby its parts may be freed during use for relative movement.

4. The structure of claim 3 characterized by the provision of automatic means for moving the arms of the levers into unit position.

5. The structure of claim 3 characterized by the provision of an actuating member pivoted concentrically with the lever arms, the levers being provided with individual locking means whereby they may be removably secured to said actuating member.

6. In combination with a motor, a pivoted member adapted to be actuated by the motor, an actuating connection between said pivoted member and motor, a plurality of levers pivoted adjacent said member, and concentrically therewith, independent means associated with each lever for securing it normally against movement in relation to said member, individual means for releasing said securing means and automatic means including said motor for re-securing said levers in relation to said member after release.

7. In combination with a heat motor, resistance heating means therefor and an actuating circuit for said resistance heating means, a pivoted member adapted to be actuated by said motor, an actuating connection between said pivoted member and motor, a plurality of levers pivoted concentrically adjacent said member, independent means associated with each lever, for securing it normally against movement in relation to said member, individual means for releasing said securing means, and circuit closing means, associated with said securing and releasing means, adapted to close the circuit through the heating resistance.

8. The structure of claim 7 characterized in that the circuit closing means associated with one lever are in circuit closing position when the lever is secured in relation to the pivoted member, whereas the circuit closing means associated with the other lever are in circuit closing position only when the lever is released from the pivoted member.

9. The structure of claim 7 characterized by the provision of an operative connection between one of said levers and the check draft door and another of said levers and the draft door of a furnace.

10. The structure of claim 7 characterized by the provision of an operative connection between one of said levers and the check draft door and another of said levers and the draft door of a furnace, the circuit closing means associated with the draft lever being in circuit closing position when the lever is secured in relation to the pivoted member, whereas the circuit closing means associated with the check draft controlling lever are in circuit closing position only when the lever is released from the pivoted member.

11. In combination with a heat motor and resistance heating means therefor, a member adapted to be actuated by the motor, an actuating connection between said member and the motor, a plurality of levers movably associated with said member, means associated with each lever for securing it normally against movement in relation to said member, means for releasing said securing means, and automatic means including said motor for re-securing said levers in relation to said member after release.

12. In combination with a motor, a pivoted member adapted to be actuated by the motor, an actuating connection between said pivoted member and motor, a plurality of levers pivoted adjacent said member, and concentrically therewith, independent means associated with each lever for securing it normally against movement in relation to said member, individual means for releasing said securing means and automatic means including said motor for re-securing said levers in relation to said member after release, including means for causing the rotation of said pivoted member after the release of said securing means.

13. The structure of claim 11 characterized by the provision of means, responsive for the release of one of said levers, for closing a circuit through said resistance heating means.

14. A draft control device for furnaces and the like, which includes a heat motor and resistance heating means therefor, a thermostat, responsive to temperatures more or less remote from the motor, in circuit with said resistance heating means and adapted normally to control the actuation of said means, a member adapted to be actuated by the motor, an actuating connection between said member and the motor, a plurality of levers movably associated with said member, means associated with each lever for securing it normally against movement in relation to said member, means for releasing said securing means, and automatic means including said motor for re-securing said levers in relation to said member after release.

15. The structure of claim 14 characterized by the provision of an operating connection between one of said levers and the draft door of a furnace, and means associated with said lever for closing the circuit through the resistance heating means, said means being operative to close such circuit when said lever is secured in relation to the motor actuated member, said circuit closing means being in circuit with the thermostat.

16. The structure of claim 14 characterized by the provision of an operating connection between one of said levers and the check door of a furnace, and means associated with said lever for closing the circuit through the resistance heating means, when said lever is released from the motor actuated member, said means being effective to close said circuit independently of the thermostat.

17. A draft control device for furnaces and the like, which includes a heat motor and resistance heating means therefor, a thermostat, responsive to temperatures more or less remote from the motor, in circuit with said resistance heating means and adapted normally to control the actuation of said means, actuating connections between said control device and the check and draft doors respectively of a furnace, manually operable means for breaking said actuating connections and means, independent of the thermostat, adapted to close a circuit through said resistance heating means in response to breaking of the actuating connection with the check door.

18. A draft control device for furnaces and the like, which includes a heat motor and resistance heating means therefor, a thermostat, responsive to temperatures more or less remote from the motor, in circuit with said resistance heating means and adapted normally to control the actuation of said means, actuating connections between said control device and the check and draft doors respectively of a furnace, manually operable means for breaking said actuating connections and means, independent of the thermostat, adapted to break the circuit through said resistance heating means in response to breaking of the actuating connection with the draft door.

19. In combination with a vapor motor having a heating coil to cause operation thereof, a rotary member operated by the motor, a plurality of actuating members associated therewith, latches adapted normally to maintain the actuating members against rotation in relation to the member and manually operable control means adapted to withdraw said latches.

20. In combination with a vapor motor having a heating coil to cause operation thereof, a rotary member operated by the motor, a plurality of actuating members associated therewith, latches adapted normally to maintain the actuating members against rotation in relation to the member and manually operable control means adapted to withdraw said latch, and a stop adapted to limit the movement of the actuating members.

21. In combination with a vapor motor having a heating coil to cause operation thereof, a rotary member operated by the motor, a plurality of actuating members associated therewith, means adapted normally to hold said actuating members against rotation in relation to the member and manually operable control means for each of said actuating members, adapted to break the connection between said actuating members and the member.

22. In combination with a motor, a work performing connection therefor adapted to be actuated by the motor in opposite directions, a rotary member operatively associated with said work performing connection, a plurality of actuating members associated with said member, means adapted normally to maintain the actuating members against rotation in relation to the member, and manually operable control means adapted to release the actuating members for movement in relation to the member.

Signed at Quincy, county of Adams and State of Illinois, this 8th day of March, 1930.

ROBERT T. WILLIAMS.